United States Patent [19]

Lewis et al.

[11] Patent Number: 4,966,757
[45] Date of Patent: Oct. 30, 1990

[54] SULFUR DIOXIDE GENERATOR

[76] Inventors: Richard A. J. Lewis, 1101 Lamplighter, RiverHeights, Logan, Utah 84321; Donald C. Forbush, 2882 Cave Hollow Way, Bountiful, Utah 84321

[21] Appl. No.: 327,240

[22] Filed: Mar. 22, 1989

Related U.S. Application Data

[63] Continuation-in-part of Ser. No. 129,044, Dec. 8, 1987, abandoned, which is a continuation-in-part of Ser. No. 940,786, Dec. 9, 1986, abandoned.

[51] Int. Cl.$^5$ .............................................. C01B 17/54
[52] U.S. Cl. ...................................... 422/62; 422/107; 422/111; 422/160; 422/161; 422/189; 422/206; 423/539; 423/543
[58] Field of Search .............................. 422/160–161, 422/189, 107, 111, 206, 62; 423/539, 543

[56] References Cited

U.S. PATENT DOCUMENTS

| | | | |
|---|---|---|---|
| 1,450,677 | 4/1923 | Chuckering | 422/160 |
| 1,545,381 | 7/1925 | Zeisberg | 422/160 |
| 1,638,992 | 8/1927 | Gillet | 422/160 |
| 3,226,201 | 12/1965 | Harmon | 422/161 |
| 3,337,989 | 8/1967 | Harmon | 422/161 |
| 3,409,409 | 11/1968 | Sackett, Sr. | 422/62 |
| 3,627,134 | 12/1971 | Mattson | 422/160 X |
| 3,723,068 | 3/1973 | McIlroy et al. | 422/161 |
| 3,907,510 | 9/1975 | Collins | 422/117 |
| 4,039,289 | 8/1977 | Collins et al. | 422/161 |
| 4,526,771 | 7/1985 | Forbusch et al. | 423/543 |

Primary Examiner—Barry S. Richman
Assistant Examiner—Amalia L. Santiago

[57] ABSTRACT

An improved apparatus for burning sulfur to sulfur dioxide and generating sulfurous acid comprising a primary sulfur-burning chamber, a sulfur feed tank closely coupled to the primary chamber, a secondary sulfur burning chamber, and an absorption tower, Air is drawn into the primary chamber under turbulent, high velocity negative pressure conditions. Gas passes through the secondary chamber under turbulent negative pressure flow conditions. The apparatus is capable of converting sulfur to sulfur dioxide at a rate in excess of 25 pounds of sulfur per hour per square foot of surface area of the molten pool of sulfur in the primary chamber.

18 Claims, 6 Drawing Sheets

SULFUR DIOXIDE GENERATOR

RELATED APPLICATIONS

This application is a continuation-in-part application of the continuation-in-part application entitled "Sulfur Dioxide Generator filed Dec. 18, 1987, Ser. No. 129,044 by Donald C. Forbush, et al, now abandoned, of the original application entitled" Sulfur Dioxide Generator filed Dec. 9, 1986, Ser. No. 940,786 now abandoned by Donald C. Forbush, et al.

BACKGROUND

Field

1. This invention is directed to an apparatus for burning sulfur to sulfur dioxide, which sulfur dioxide is then used to generate sulfurous acid.

State of the Art

2. Various small sulfur burning sulfur dioxide generators are known, such as those described in U.S. Pat. Nos. 3,226,201, 3,337,989, 3,627,134, 3,907,510 and 4,039,289. These devices are limited in the maximum burning rate of sulfur per hour to approximately 7 pounds of sulfur per hour per square foot of burning surface. Assignee devised a Sulfurous Acid Generator, U.S. Pat. No. 4,526,771 utilizing a positive pressure air feed system which significantly increased the sulfur burn rate and efficiency, but did not provide sufficient ability to provide varying strengths of acids required by farmers for differing agricultural applications. Because of the positive air pressure oxygen feed system, applicant's previous invention was subject to sulfur dioxide leaks through breaks in seals, and machine welds which could jeopardize the operator. The heat produced from burning sulfur was not recaptured, but dissipated into the atmosphere. The present invention eliminates these deficiencies, as more fully described below.

SUMMARY OF THE INVENTION

The present invention comprises as its primary components a sulfur feed tank, a primary sulfur-burning chamber in communication with a secondary sulfur-burning chamber, and an absorption tower. A heat collection unit may also be included to remove excess reaction heat. The primary sulfur burning chamber comprises a negative pressure enclosure adapted to have a pool of molten sulfur therein, a sulfur inlet at a first lower elevation, a primary oxygen-containing gas inlet at a second, relatively higher, elevation, and a gas outlet.

Preferably, the sulfur feed tank is closely coupled to the primary burn chamber to insure that molten sulfur is continuously provided to the sulfur pool. This close coupling can be accomplished with a short conduit between the sulfur feed tank and the sulfur inlet of the primary burn chamber, where the conduit has a cross-sectional area sufficient to allow enough sulfur to pass into the primary burn chamber from the feed tank at sufficient flow to sustain the maximum burn rate, but sized to provide sufficient sulfur flow resistance to prevent sulfur from entirely filling the burn chamber. A conduit cross-sectional area of from 15 to 80% of the surface area of the sulfur pool and a length less than the diameter of the pool, as described in applicant's previous sulfur dioxide generator application, is an example of one sizing range which achieved desired sulfur flow rates.

The gas generated in the primary burn chamber contains sulfur, sulfur dioxide and unreacted oxygen. It is passed to the secondary negative pressure burn chamber. The secondary burn chamber draws in the the gas generated in the primary burn chamber, and provides sufficient residence time and contains means such as baffles which cause the gas passing therethrough to undergo turbulent flow to insure that substantially all of the sulfur is converted to sulfur dioxide. An oxygen-containing secondary air inlet leading into the secondary chamber is included to stabilize the intake air drawn into the primary burn chamber. This also insures sufficient gas flow through the secondary burn chamber to prevent sublimation of sulfur within the secondary burn chamber. Means are associated with the secondary air inlet to regulate the air flow therethrough drawn into and raising the negative pressure into the secondary chamber in response to the pH of the sulfurous acid produced in the absorption tower. The raising of the pressure by injection of air into the secondary chamber in turn reduces the amount of gases drawn from the primary chamber; thereby increasing the residence burn time of gases drawn into the primary burn chamber to produce more completely burned sulfur dioxide. This more complete burning prevents sulfur sublimation within the secondary burn chamber.

The absorption tower has a water inlet at its top and a sulfur dioxide gas inlet at its bottom for countercurrent flow of sulfur dioxide gas and water therein. There is a conduit between the sulfur dioxide gas inlet of the absorption tower and the outlet of the secondary chamber. Evacuation means, such as an exhaust fan or blower, is associated with the top of the absorption tower to create negative pressure therein to draw the sulfur doxide gas from the secondary burn chamber; thereby also creating negative pressure within both the secondary and primary burn chambers as well as the feed tank.

Preferably, the primary and secondary oxygen-containing gas inlets are oriented to introduce oxygen-containing air into the primary and secondary chambers tangentially to provide sufficient velocity to form turbulent gas flow.

A pH sensor is associated with the acid produced by the absorption tower effluent. The pH sensor signals are electro-mechanically interpreted by a valve associated to adjust the air flow through the secondary air inlet. As higher acid pH is required to be produced, the secondary inlet is restricted by the valve to allow less air into the secondary burn chamber. This restriction of the secondary gas inlet draws more air into the primary burn chamber from the primary inlet to burn more sulfur and produce more sulfur dioxide gas. Conversely, as weaker acid pH is required, the secondary air inlet is opened wider to allow more air into the secondary burn chamber. This opening of the secondary air increases the air flow into the secondary burn chamber to increase the pressure in both the primary and secondary burn chambers. Thus less air is drawn into the primary burn chamber to burn less sulfur.

Heat extraction means, such as a water jacket, may be associated with the primary and secondary burn chambers to convert surplus reaction heat generated therein to mechanical-thermal energy. Preferably, the heat extraction means are associated in a manner to withdraw only surplus reaction heat from the burn chambers and prevent lowering of the chamber temperatures to a point which causes precipitation of sulfur within the burn chamber walls. In one preferred embodiment, the primary and all but the discharge end of the secondary burn chambers are insulated to prevent heat losses. Heat extraction means are associated with the unshielded end of the secondary burn chamber between the absorption tower to extract heat after complete burning of the sulfur. This extracted heat may be used to produce steam to drive electrical or mechanical devices such as steam operated pumps, or turbines for electrical production.

Thus, the improved negative air fed sulfurous acid generator not only produces a wide range of strengths of sulfurous acid for irrigation, waste treatment, and other applications, it may also supply some of the power needs of its users. It also prevents accidental leakage and exposure of the operator to SO2 gas.

DESCRIPTION OF THE ILLUSTRATED EMBODIMENTS

With reference to the figures, applicant's sulfurous acid generating system 10 according to the present invention comprises a negative air intake control system adapted to more consistently control the sulfur burning and acid production problems encountered by its previously described machine, U.S. Pat. No. 4,526,771. Its principal elements comprise an open grid support skid 12, a sulfur feed tank or hopper 14, a primary sulfur-burning chamber or zone 16, an absorption tower or zone 20, a sulfurous acid receiving tank 22, an exhaust fan 24, an acid pump 26, and a control box 28. All the elements are supported on the skid 12 so that the entire unit can easily be transported on a flatbed truck. The elements can easily be disassembled for transport and replacement, as required.

Figure 1:
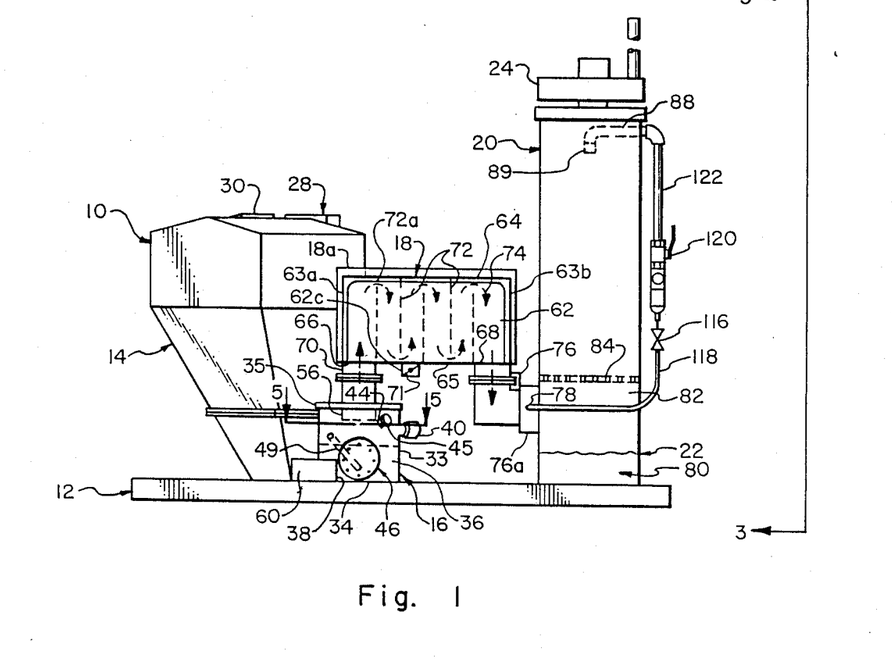
FIG. 1 illustrates one embodiment of the invention.
Figure 2:
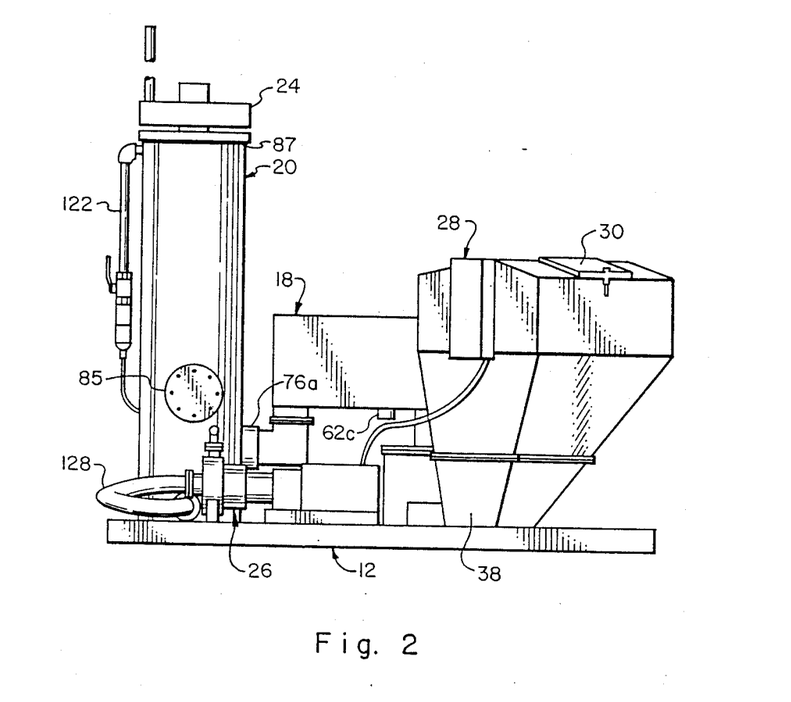
FIG. 2 is a rear elevation view of the apparatus shown in FIG. 1
Figure 4:
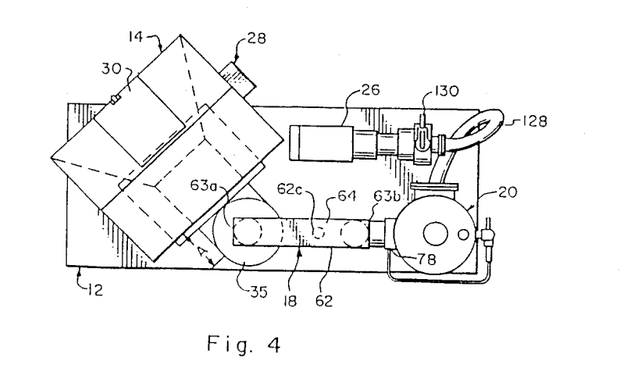
FIG. 4 is a top plan view of the apparatus of FIG. 1.

The sulfur feed tank or hopper 14 is sized to hold a multiple day supply of sulfur to meet the needs of a user. The feed tank or hopper 14 is self-feeding—i.e. no conveyor system is required to feed sulfur from the feed tank to the primary sulfur-burning chamber 16, although a vibrator (not shown) may be included. As shown by FIGS. 1,2, and 4, the wall of the sulfur feed tank 14 facing the primary sulfur-burning chamber 16 is flat, and the bottom portion of the wall of the sulfur feed tank 14 farthest from the primary sulfur-burning chamber 16 slopes inwardly toward the primary sulfur-burning chamber 16. The sulfur feed tank 14 is shown in the figures diametrically opposite the location in which air is introduced into the primary sulfur-burning chambers 16.

The feed tank 14 may include a top 30 to protect the sulfur supply from the weather. Because of the negative air pressure system, it is not necesary to have an airtight feed tank 14 to prevent the escape of gases generated in the primary sulfur-burning chamber 16. These gases are all drawn into the sulfur-burning chambers 16,18.

The primary sulfur-burning chamber 16 comprises a cylindrical enclosure 32 formed by a tubular side wall 33, a flat bottom wall 34, and a flat top wall 35. The primary chamber 16 is adapted to have a pool 36 of molten sulfur therein. The size of the bottom wall determines the surface area and diameter of the molten pool 36. As used herein, the term "burning surface" refers to the top surface of the pool 36. A sulfur inlet 38 is provided in the side wall 33 at a first elevation for feed of sulfur into the pool 36.

An oxygen-containing air inlet 40 is provided at a second, relatively higher, elevation in the side wall 33 for introduction of an oxygen-containing gas into the enclosure 32. Preferably, the sulfur inlet 38 and the oxygen-containing air inlet 40 are diametrically opposite each other. This is done so that incoming cool air does not cool molten sulfur at the sulfur inlet 38 and so that the hottest portion of the primary chamber 16 is adjacent the feed tank 14 to melt incoming sulfur. It is important that the sulfur at the inlet 38 be maintained at a temperature higher than its melting point to maintain a constant feed of molten sulfur to the sulfur pool 36.

An access port 44 in the side wall 33 with a cap 45 gives access to the inside of the primary chamber 16 to light sulfur therein. An electronic ignition device, such as an electric heating wand 49, having its own port can be used. In more remote areas without electricity, an alcohol bunsen burner, also structured as a heating wand 50, can be used to initially ignite the sulfur. The sulfur, once ignited, is then manually fanned with blower means such as hand operated bellows 51 in communication with the primary burn chamber through a sealable port (not shown) in the cap 40 until sufficient heat is generated to continue the exothermic combustion reaction.

A covered cleanup port 46 is provided for cleaning out the primary sulfur burning chamber 16 as necessary.

Figure 5:
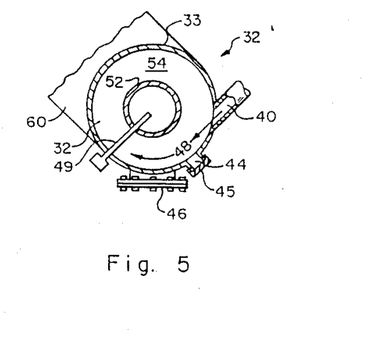
FIG. 5 is a top sectional view of the primary sulfur burning chamber of the apparatus of FIG. 1 taken along line 5—5 in FIG. 1

The gas inlet 40 is oriented to introduce oxygen-containing gas tangentially and approximately horizontally, thereby creating a high-velocity, turbulent, cyclonic flow of oxygen-containing gas 48 in the primary chamber 16. A depending skirt 52 hangs down to an elevation below that of the elevation of the oxygen-containing air inlet 40 to contribute to this cyclonic flow of gas 48. This is accomplished by the incoming oxygen containing gas 48 being displaced vertically by the skirt 52. As shown in FIG. 5, the skirt 52 forms a closed-at-its-top annular region 54 proximate to the oxygen-containing air is important in that it insures that any carbon-containing impurities that collect on the top of the sulfur pool 36 are burnt off. The presence of impurities on the top of the sulfur pool 36 interferes with the burning of the sulfur and decreases the capacity of the sulfurous acid generator 10.

A gas outlet 56 extends through the top wall 35. This is the only outlet for gas from the primary chamber 16. A conduit 60 provides molten sulfur to the sulfur pool 36 from the base of the sulfur feed tank 14 via the sulfur inlet 38 of the primary burn chamber 16. Sulfur present in the conduit 60 is melted by the heat generated by the exothermic combustion of sulfur in the primary chamber 16. To maintain a steady flow of sulfur to the primary chamber 16, it is important that the feed tank 14 and the primary chamber 16 be closely coupled together. In one embodiment, this is accomplished by sizing the conduit 60 so its length is less than the diameter of the burning surface, i.e. is less than the diameter of the primary chamber 16. For example, for a primary burn chamber 16 having a diameter of 15 inches, the maximum length of the conduit 60 (distance A in FIG. 4) preferably is about 10 inches long, i.e. less than about 70% of the diameter of the burning surface pool 36. Preferably, the cross-sectional area of the conduit 60 is at least about 15% of the surface area of the burning surface pool 36. Further, the conduit 60 preferably has a large cross-sectional flow area compared to the diameter of the sulfur pool 36. The cross-sectional area of the conduit 60 is preferably from about 30 to about 40% of the surface area of the pool 36. For example, for a primary chamber having a diameter of 15 inches, a preferred conduit is one that is 5 inches tall and 15 inches wide, thus providing a cross-sectional area of about 40% of the surface area of the sulfur pool 36. However, as outlined above, the conduit 60 is just sized to deliver the required maximum sulfur flow required into the primary burn chamber 16, and provide sufficient resistance to prevent the melted sulfur from filling the entire primary burn chamber 16 and eliminating the air burn space above the sulfur pool 36.

The secondary chamber 18 has the shape of an elongated box, having upstanding side walls 62, a first end up-standing end wall 63A, a second end upstanding end wall 63B, a horizontal top wall 64, and a horizontal bottom wall 65 adjacent the second end wall 63B. The gas inlet 66 is located vertically above and vertically spaced apart from the gas outlet 56 of the primary chamber 16 and connected thereto by a conduit 70. A second oxygen-containing air inlet 62C is located in the bottom wall 65 proximate the gas inlet 66. This air inlet 62C is opened and closed by a butterfly valve 71 mechanically activated in response to signals from a pH sensor (not shown) in contact with the acid effluent.

The secondary chamber 18 is used for burning any unreacted sulfur present in the effluent gas from the primary chamber 16. For this purpose, it is important that the secondary chamber 18 provides sufficient residence time for burning of the sulfur and at the same time provides adequate mixing of the gases passing therethrough to bring unoxidized sulfur into contact with oxygen. To provide adequate residence time in the secondary chamber 18, in one preferred embodiment, the ratio of the volume of the secondary chamber 18 in cubic feet to the surface area of the sulfur pool 36 in square feet is at least about 1, preferably at least about 1.2, and more preferably at least about 1.4. The exact ratio depends upon the type and amount of oxygen-containing air used to burn the sulfur.

To obtain good mixing of the gases in the secondary chamber 18, a plurality of vertical baffles 72 extending alternatively up from the bottom wall 65 or down from the top wall 64 are provided. Preferably, each baffle 72 is welded to both side walls 62 and either the top wall 64 or the bottom wall 65 and is spaced apart a small distance, in the order of about 2 to 3 inches from either the opposing top wall 64 or the opposing bottom wall 65. This provides a tortuous flow path through the secondary chamber 18 as indicated by arrows 74. Moreover, the relatively small clearance between the baffles 72 and either the top wall 64 or the bottom wall 65 causes greatly increases gas velocities adjacent the ends of the baffles 72, resulting in turbulent flow in the secondary chamber 18 and intimate mixing of the gas passing therethrough. This insures that substantially all of the unreacted sulfur present in the secondary chamber is combined with oxygen to produce sulfur dioxide.

The gas outlet 68 from the secondary chamber 18 is directly above the sulfurous acid receiving tank 22 and is connected thereto by a short conduit 76 which is provided with the quench water inlet 78. Sulfurous acid 80 is collected in the collection tank 22. There is a gas space 82 in the collection tank 22 above the acid 80. Gas from the secondary chamber 18 passes through the conduit 76, through the air space 82, to enter the base of the absorption tower 20.

The primary and secondary chambers 16, 18, are preferably insulated with a blanket shield 18A to prevent loss of heat. A heat exchanger water jacket system 76A surrounds and is associated with the short conduit 76 to remove heat from the gas stream prior to being injected into the absorption tower 20. Steam is produced by the water jacket system 76A and used to drive mechanical devices (not shown), such as a pump, to assist in moving water from the ground water source through the generator 10 and onto the fields or other acid treatment areas. The extracted heat may also be used for process heating. The gas stream is simultaneously cooled by the water jacket system 76A, which aids in the absorption acid production process. It also minimizes vapor and acid losses out of the tower 20 which previously resulted when the higher temperature gases kept the tower 20 at elevated temperatures.

Figure 3:
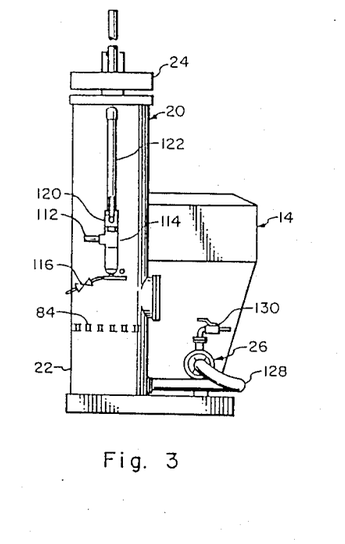
FIG. 3 is a side elevation view of the apparatus of FIG. 1 taken along line 3—3 of FIG. 1

The absorbtion tower 20 is a packed tower, having near its bottom a packing support grid 84 (see FIG. 3). The tower is substantially completely filled with packing (not shown). A suitable packing comprises 1-inch out diameter, schedule 125 polyvinylchloride pipe cut into 1-inch lengths randomly loaded into the tower 20.

Alternatively, the packing can be 1 inch polypropylene saddles in a depth of at least about 5 feet on top of six inches of 1 inch stainless steel pall rings to dissipate any heat. The depth of the packing varies according to the overall performance requirements of the machine. The pall rings are not necessary where the water jacket system 76A removes the heat prior to entering the tower 20, or the secondary burn chamber 18 is run at sufficient flow rates to reduce the temperatures of the gases entering the tower 20

The tower 20 has a covered access port 85 shown in FIG. 2.

With reference to FIG. 3, the top of the tower 20 may be provided with a demister (not shown) that is supported by brackets welded to the inside wall of the tower 20. The demister separates any entering liquid from vapor passing out of the top of the absorption tower. A suitable demister is available from Otto H. York Company.

Also supported on the top of the tower is an exhaust fan 24, which draws gases into the absorption tower 20 and creates a negative pressure throughout the primary and secondary sulfur burning chambers 16, 18. This exhaust fan 24 preferably operates at a range of 5 c.f.m. to 75 c.f.m., and can be regulated to operate over differing ranges, if necessary to move more air into the primary burning chamber 16. However, the fan speed is preferably fixed at 65 c.f.m. to move the optimal amount of oxygen-containing air into the primary burning chamber 16. The size of the secondary air inlet opening 62C is then adjusted in response to the pH sensor readings to vary the amount of oxygen-containing air entering the primary burning chamber 16 through the primary air inlet 40, as described below. The size of the fan 24 is increased in proportion to the increase in the size of the secondary air inlet opening 62C on various sized generator models.

The brackets (not shown) also support a water distribution assembly which supplies water to the tower 20.

Alternatively, a spray nozzle available from Spraying Systems of Wheaton, Ill., model 2RR 9545, can be used.

Water for the quench water and for the absorption tower 20 is provided by an inlet pipe 112 that is connected to a T-connector 114. The T-connector 114 distributes water through a valve 116 to a hose 118 connected to the quench water inlet 78. The other side of the T-connector is connected to a valve 120 that is used to control flow of water through a PVC pipe 122 that is connected to the segment of plastic pipe 88 coupled to the water distribution assembly 89.

In a preferred version of the absorption tower 20, the tower 20 is made of plastic, such as PVC, rather than stainless steel, and the gas inlet 76 is a nozzle that extends into the tower 20 and directs incoming gas downward toward the receiving tank 22. With this configuration incoming water cools the gas inlet nozzle 76 and helps avoid corrosion.

The oxygen-containing air can be any gas that provides free oxygen for combining with sulfur. Preferably, the gas is ambient air, although air enriched with oxygen, or air of reduced oxygen content can be used.

The sulfurous acid removal system comprises a discharge pump 26 that is connected by a hose 128 to the bottom of the sulfurous acid receiving tank 22. There is a valved discharge line 130 from the pump 26. A level control system (not shown) is used to insure that the pump 26 does not withdraw sulfurous acid from the receiving tank (not shown) at a rate faster than it is generated.

A standpipe (not shown) is connected to the base of the receiving tank to insure that the absorption tower 22 does not become flooded with liquid. The standpipe can be pivoted to drain the receiving tank 22 during the shut-down.

Carbon steel can be used for the construction of the sulfurous acid generator 10, although preferably stainless steel is used for components in contact with sulfur dioxide and high heat such as the feed tank, conduits 60,70 and 76, and the primary and secondary combustion chambers 16, 18.

A control box 30 is provided with electrical controls for operating the discharge pump 26, the pH sensor (not shown), and the butterfly valve 71. In addition, sensing elements (not shown) are provided to monitor the temperature in the absorption tower, the water pressure of incoming water, and the pH of the sulfurous acid. If the pressure of the incoming water is below a set value or if the temperature in the absorption tower becomes too high, the flow of oxygen-containing gas is shut off by shutting down the exhaust fan 24.

Figure 6:
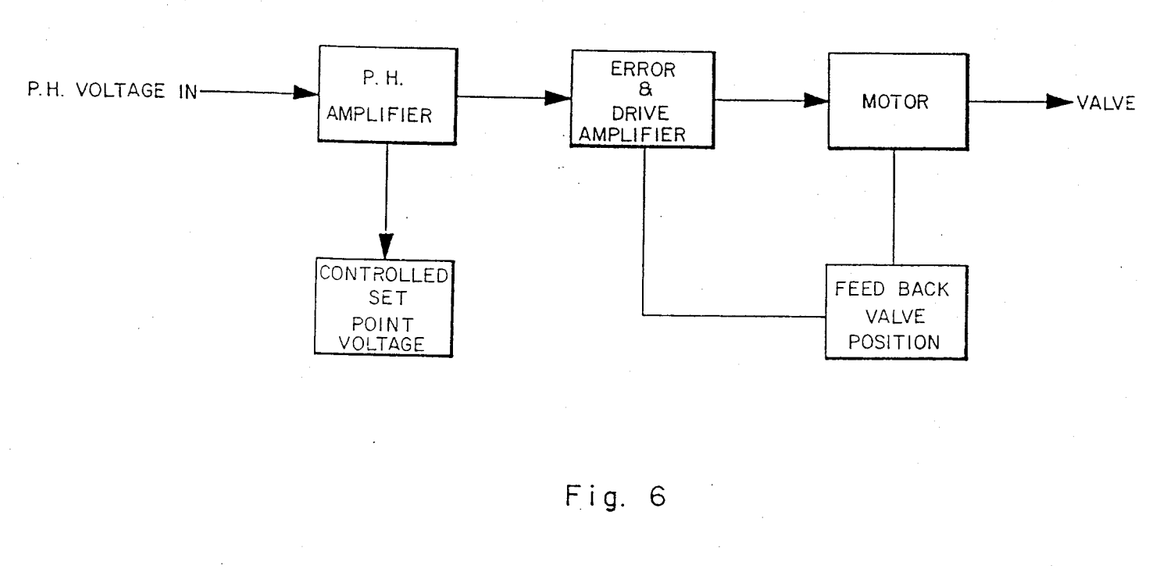
FIG. 6 is a block diagram of the pH control system.
Figure 7:
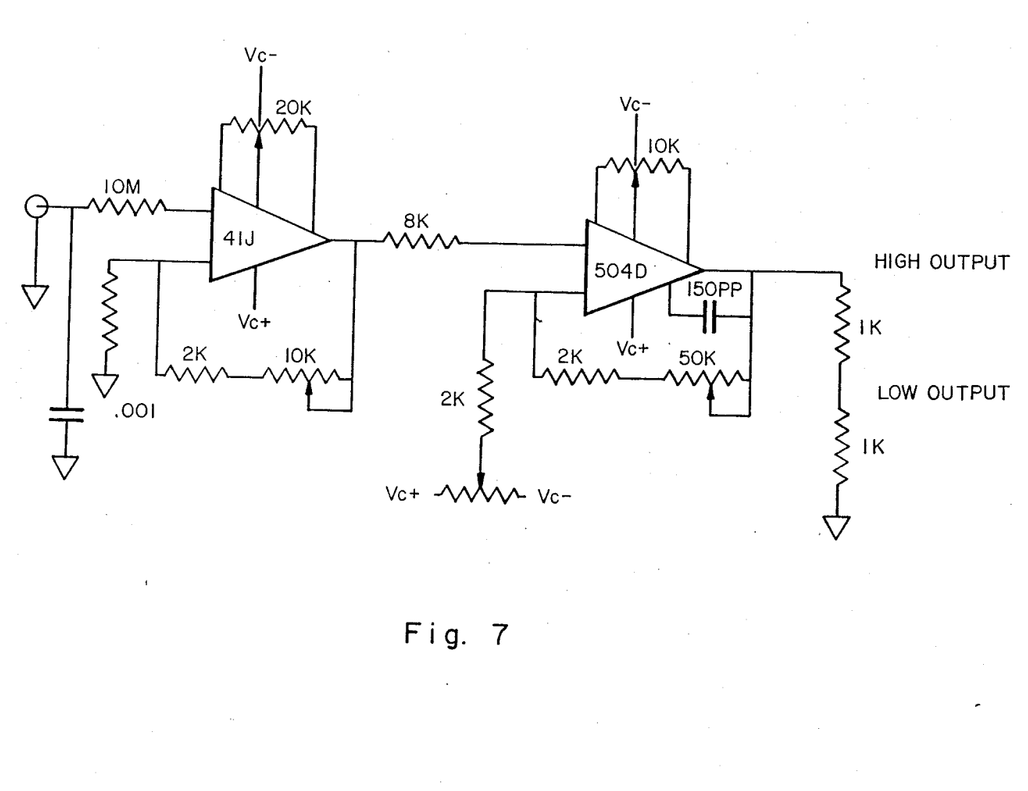
FIG. 7 is a schematic diagram of one preferred pH monitoring circuit.
Figure 8:
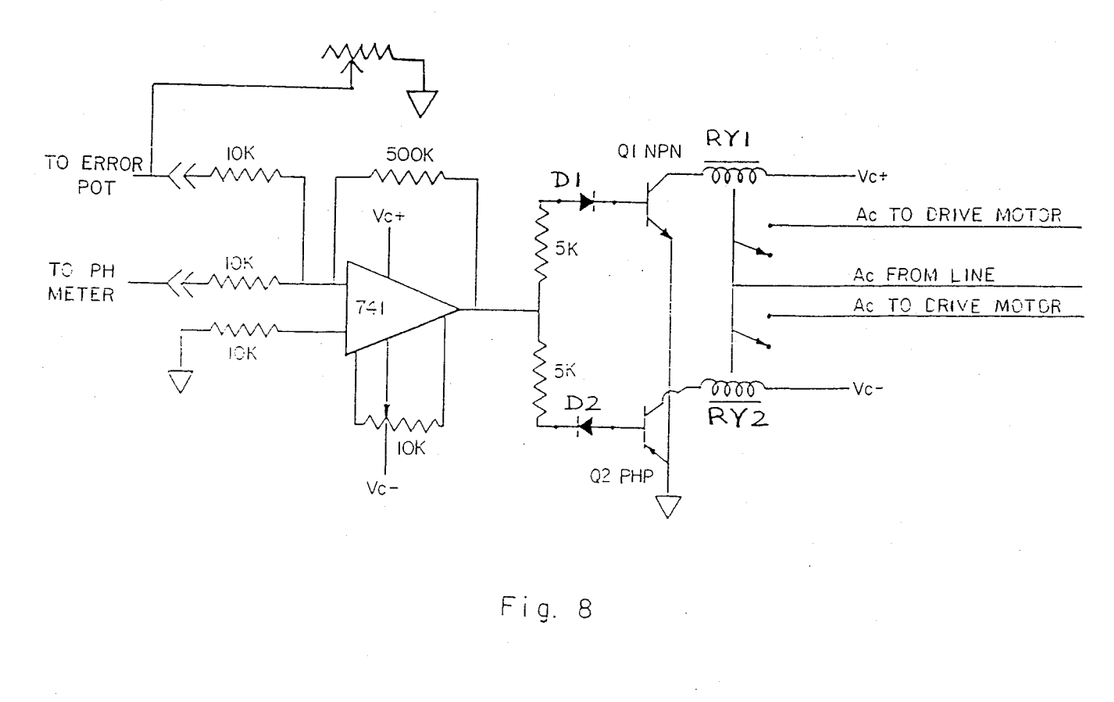
FIG. 8 is a schematic diagram of a preferred valve control circuit.

FIGS. 6,7, and 8, illustrate a preferred controller circuit for measuring and controlling the pH of the acid produced by the generator 10. First, pH signals from the probe (not shown) are equated to a voltage. The voltage from the pH probe is fed into a J Fet Instrument Amplifier where it is amplified and compared to a preset desired pre-calibrated control voltage. This control voltage is pre-set at desired values opposite that produced by the pH probe. The circuit sums the probe and reference voltages and determines whether the inputs are in balance. If the measured value is not in balance, an error signal is generated. This error signal is fed to an error amplifier to drive a motor circuit to open and close the butterfly valve 71. If the error exceeds a designated tolerance, a signal is transmitted to the control motor to reposition the butterfly valve 71. A several second delay circuit is usually incorporated to prevent the motor from driving too far in reaction to a temporary pH spike reading. To minimize pH probe reading errors, a continuous sample of the acid effluent is withdrawn and transmitted to a vacuum insulated flask into which the probe is located. This insulated flask protects the probe from external heat caused sensing errors. The continuous sample flows into the test flask to provide an averaging acid composition which prevents the generation of widely fluctuating pH readings. An outlet in the flask is included in association with an acid return circuit to transmit the sample acid back into the scrubbing tower.

FIG. 7 illustrates a simple circuit pattern. A pH electrode is used to sense, in a solution, acidity or alkalinity, and equates it into a value of voltage depending on the degree of acidity of alkalinity present. The voltage is very small, i.e. millivolts, and has a polarity of plus or minus depending on whether it is acid or alkaline. The electrode is very sensitive to any change in voltage. The circuitry must be capable to meet the demands of the electrode. The circuitry includes a pair of operational amplifiers sufficient to meet these demands. The first amplifier is a 41J, and the second is a 504D. Examples of preferred 41J and 504D amplifiers are those produced by Analog Devices. The 41J is particularly well suited to work with pH electrodes. The 504D is used as a buffer between the external circuitry and the sensitive 41J amplifier. Both amplifiers require a dual power supply to sense plus or minus signals with equal accuracy. The also have tow signal inputs, in this design, with one input on each amplifier referenced to ground.

In operation, an example of the signal follow throughs are as follows: Assume that the desired pH signal is 50 millivolts. This voltage is applied to the 41J amplifier where it is accepted without disturbing the electrode. In this design the 41J is intended only to accept the electrode voltage, with a gain near one, assume the gain to be one. A signal of one is now applied to the input of the 504D amplifier. The gain of the 504D amplifier can be varied, but assume that it is set for 25. The 504D amplifier now not only buffers the 41J amplifier from outside interference, but amplifies the signal from 50 to 1.25. This value of voltage is now available to outside circuitry and is of a large enough value to be processed easily. Any electrode signal is now seen at the output and is an accurate representative of the pH voltage.

FIG. 8 illustrates a preferred circuit designed to function as a motor drive control. It has an operational amplifier similar to those in the pH circuitry, though not as accurate. It is known as a 741 operational amplifier, and is similar in its characteristics to the 41J and 504D amplifiers. It also has one of its inputs referenced to ground, and the other input accepts the output signal from the 504D in the pH circuitry. The output of the 741 voltage is applied to a steering diode junction, where, depending on the voltage polarity, the diode accepts and passes the voltage to the input of a transistor switch. The transistor switch has in its circuitry a relay that when activated, sets a motor in motion and a given direction. The motor positions a valve that controls the supply of material to the process. Attached to the valve is a potentiometer that has a voltage applied across it. A portion of this voltage is applied to the same input of the 741 as the pH signal is applied, but is of opposite polarity, giving a summing action to the 741 operational amplifier.

In operation, an example of the signal follow throughs are as follows: At calibration time, the potentiometer attached to the valve 62C becomes what is termed an error signal source, and is set to apply a signal to the input of the 741 equal to and opposite to polarity to the pH signal (in this case 1.25). As long as the pH signal remains at 1.25, the output signal is zero. If the pH signal changes, the input signal is no longer 1.25 and the input at the 741 is no longer zero, the output then changes to a polarity and value sufficient to turn one of the relays on, giving command to the drive motor to move. The drive motor will move the valve to a position that would send an error signal back to the input of the 741 to sum out the pH signal. When the valve is moved it also allows a change in material flow and that changes the process, bringing the pH signal back to the desired set point.

Figure 9:
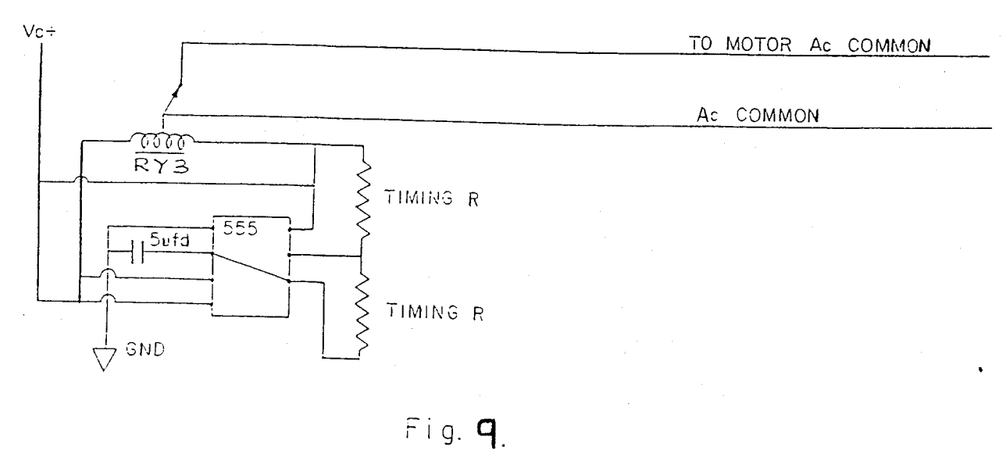
FIG. 9 illustrates another embodiment of the invention.

FIG. 9 is a circuit designed to control the on/of time of the drive motor. It consists of an ic device referenced as a 555 time. Its function is to have an output of measured programmable time, on and off. It was felt that the drive motor may drive too far at one time or get into a hunting cycle. This circuit allows the drive motor to operate approximately two second out of every ten to twelve seconds. This is accomplished by the external timing resistors and a capacitor. A relay in the output of the timer is activated by the on time of the timer. The contacts of the relay control the drive motor by connecting or disconnecting the ac common voltage line to the ac source.

In operation of the generator 10, sulfur in the primary sulfur-burning chamber 16 is ignited and air is continuously drawn into the chamber from the oxygen-containing primary air inlet 40. The amount of the air introduced controls the rate at which sulfur is burned. At maximum capacity, in the order of about 25 to about 30 pounds of sulfur per square foot of burning surface per hour is burned. About 1 to about 2 CFM (cubic feet per minute) of air per pound of sulfur burned is used.

For each pound of sulfur burned, approximately 4,000 btu's per pound is generated. At a given rate of sulfur consumption, the total heat ($H_t$) produced can be calculated. The maximum total heat produced by the device 10 is the apparatus consumption in pounds of sulfur burned per hour times 4,000 btu's per pound of sulfur. For a small generator consuming between 8 and 16 lbs. per hour, at the lowest operating level, the available potential horsepower output is approximately 8 lbs. per hour×4,000 btu's per pound−0.000392752 Hp.hr./lb=approximately 12 horsepower per hour. This amount of power may be enough to pump acidified irrigation water through a pivot or drip irrigation system, or draw water from a stream or shallow well. In rural or undeveloped areas, a small model improved sulfur dioxide generator 10 thus provides an inexpensive portable power source as water is being treated for various applications. The larger consumption sulfur dioxide generators 10 used with water treatment systems provide a major source of steam and electrical power to operate water and waste treatment plants.

The oxygen-containing gas inlet 40 is sized so that the oxygen-containing gas enters the primary chamber 16 at high velocity, preferably at least about 30 feet per second. Preferably, the velocity is less than about 125 feet per second to avoid blowing out the flame.

An advantage of these high velocities is that high sulfur burning rates are achieved because of burn off of carsul. Carsul is a sulfur/carbonaceous material resulting from sulfur combining with carbonaceous impurities within the raw sulfur. Carsul can collect on the surface of the sulfur pool, preventing oxygen from reaching the underlying sulfur, and thereby reducing the sulfur burn rates. Because of the use of high air circulation rates, the carsul accumulates at the center of the pool where portions rise above the level of the liquid sulfur. This carsul is no longer coated with sulfur, and thus can burn off.

The velocity at which air is drawn (cfm) into the primary chamber 16 is determined by dividing the rate at which air is drawn in, by the primary air inlet 40 diameter (sq.ft.)

Preferably, the temperature in the primary chamber 16 is sufficiently high that sulfur in the pool 36 is vaporized. A portion of this vaporized sulfur is burned in the primary chamber 16 in the gas space above the sulfur pool 36. Effluent gas passes from the primary sulfur-burning chamber 16 via the conduit 70 into the secondary sulfur-burning chamber 18. The effluent gas contains sulfur dioxide, carbon dioxide, oxygen, and unreacted sulfur vapor. In the secondary chamber 18, because of the turbulent flow conditions and long retention time, substantially all of the sulfur in the effluent gas is converted to sulfur dioxide.

The maximum temperature in the secondary burning chamber 18 occurs in the first section 134 that is formed by the first side wall 63A, the top wall 64, the bottom wall 65 and the first baffle 72A. The maximum temperature is at least about 1000 degrees F., and preferably is maintain between 1000 to 1500 degrees F., and more preferably between about 1300 and 1400 degrees F. When the temperature in the secondary chamber 18 is mentioned herein, reference is being made to the temperature in the first section of the secondary chamber 18.

The velocity of the inlet gas into the secondary sulfur-burning chamber 18 is at its maximum proximate to the end of the baffles 72. This velocity preferably is at least about 750 feet per minute to obtain turbulence with resultant oxidation of substantially all of the sulfur present.

Gas passing from the secondary chamber 18 is quenched with quench water introduced through the quench water inlet 78 at a rate of about 0.1 to about 0.15 gallons per minute of water per pound per hour of sulfur burned to prevent damage to the packing in the absorption tower 20. The rate is varied depending upon the temperature in the secondary chamber 18.

Some sulfur dioxide in the gas withdrawn from the secondary chamber 18 is absorbed in the quench water which is collected in the receiving tank 22. The remainder of the sulfur dioxide is absorbed into water introduced into the top of the absorption tower 12 through the distribution assembly 90 as the gas passes upwardly through the tower. Water in the tower 20 is used at a rate of from about 1 to about 2 gallons per minute per pound of sulfur burned per hour.

The sulfur dioxide content of the gas withdrawn from the secondary sulfur-burning chamber 18, prior to the quench, is about 8% to 14% sulfur dioxide by volume, while the gas passing out of the absorption tower 20 contains substantially no sulfur dioxide.

Because of the exhaust fan 24, the entire system, including the primary and secondary chambers 16, 18, is under negative pressure. All sulfur dioxide gas produced is therefore drawn through the tower 20 to produce sulfurous acid; thereby preventing leakage to the atmosphere.

Although the present invention has made reference to the illustrated embodiments, it is not intended to restrict the scope of the appended claims. The claims themselves recite those limitations deemed necessary for the invention.

We claim:

1. In an apparatus for burning sulfur with oxygen containing air comprising:
    a primary sulfur-burning chamber defined by an enclosure with a gas outlet, said enclosure holding a pool of molten sulfur therein, a sulfur inlet at a first, lower elevation of the enclosure for feed of sulfur into the primary sulfur-burning chamber, and having:
        ignition means positioned to contact the sulfur within the primary sulfur-burning chamber to ignite and start the exothermic sulfur combustion reaction within said primary sulfur-burning chamber; and
        a primary air inlet positioned in the enclosure so that air will flow in a tangential direction at a second, relatively higher elevation of the enclosure above the sulfur inlet for introduction of air tangentially into the primary sulfur-burning chamber to introduce a substantial amount of air used for burning and vaporizing the sulfur supplied thereto to form an effluent gas containing sulfur, sulfur dioxide, and oxygen;
    a sulfur feed tank for supplying sulfur to the primary sulfur-burning chamber, the sulfur feed tank being adapted to receive heat from the primary sulfur-burning chamber for the melting of sulfur in the sulfur feed tank;
    a conduit leading from the sulfur feed tank to the sulfur inlet for transferring sulfur from the sulfur feed tank to the primary sulfur-burning chamber, the cross-sectional area of the conduit from the tank being sized to allow sufficient sulfur into the burning chamber to supply the optimal burning rate, while providing sufficient flow resistance to the sulfur to prevent the primary burning chamber from entirely filling with sulfur;
    a secondary sulfur-burning chamber having
        a gas inlet in communication with the gas outlet from the primary sulfur-burning chamber enclosure at a first end of the sulfur-burning chamber to receive effluent gas containing sulfur, sulfur dioxide, and oxygen discharged from the gas outlet of the primary sulfur-burning chamber, and
        a secondary air inlet proximate the first end of said secondary sulfur-burning chamber to allow desired amounts of oxygen-containing gas to enter the secondary sulfur-burning chamber;
        means defining a tortuous flow path of said secondary sulfur-burning chamber for causing turbulent flow of gas passing therethrough for combustion with the secondary air of substantially all of the sulfur in the effluent gas to sulfur dioxide;
        a gas outlet at a second end of said secondary sulfur-burning chamber to transmit burned gases out of the secondary sulfur-burning chamber, wherein the improvement comprises:
    negative pressure means operably connected to the primary and secondary sulfur-burning chambers for creating negative pressure within the primary and secondary sulfur-burning chambers to draw in desired amounts of oxygen-containing gas into said chambers through the first and secondary air inlets; and
    means connected to the secondary air inlet to variably control the amount of air drawn through the secondary air inlet, thereby controlling the amount of oxygen-containing air entering the primary and secondary sulfur-burning chambers in response to a pH measurement.

2. The apparatus of claim 1 in which the ignition means comprise an electrically activated heating wand.

3. The apparatus of claim 1 in which the primary sulfur-burning chamber comprises an internal skirt, the skirt positioned in the primary sulfur-burning chamber so as to form an annular region above the primary air inlet.

4. The apparatus of claim 3 in which the primary air inlet is substantially diametrically opposite the sulfur feed tank.

5. The apparatus of claim 1 or 4 in which the sulfur inlet and the primary air inlet are substantially diametrically opposed.

6. The apparatus of claim 1 in which the conduit from the sulfur feed tank cross-sectional area is up to about 40% of the surface area of the primary sulfur-burning chamber enclosure 7. The apparatus of claim 1 including heat conversion means surrounding the primary and secondary burning chambers to capture and convert surplus reaction heat into thermal or electro/mechanical energy.

8. The apparatus of claim 1, wherein the means to control the secondary air inlet comprises an electromechanical butterfly valve which limits the flow area of the secondary air inlet opening in response to the user's requirements for higher or lower pH acid production.

9. In an apparatus for generating sulfurous acid comprising:
    a primary sulfur-burning chamber defined by an enclosure with a gas outlet, said enclosure holding a pool of molten sulfur therein, a sulfur inlet at a first, lower elevation of the enclosure for feed of sulfur thereto, and having:
        ignition means positioned to contact the molten sulfur within the primary sulfur-burning chamber to ignite and start the exothermic sulfur combustion reaction within said primary sulfur-burning chamber; and
        a primary air inlet positioned in the enclosure so that air will flow in a tangential direction at a second, relatively higher elevation of the enclosure above the sulfur inlet for introduction of air tangentially into the primary sulfur-burning chamber to introduce substantially all of the air used for burning and vaporizing the sulfur supplied thereto to form an effluent gas containing sulfur, sulfur dioxide, and oxygen;
    a sulfur feed tank for supplying sulfur to the primary sulfur-burning chamber, the sulfur feed tank being adapted to receive heat from the primary sulfur-burning chamber for the melting of sulfur in the sulfur feed tank;

a conduit leading from the sulfur feed tank to the sulfur inlet for transferring sulfur from the sulfur feed tank to the primary sulfur-burning chamber, the cross-sectional area of the conduit from the tank being sized to allow sufficient sulfur into the burning chamber to supply the optimal burning rate, while providing sufficient flow resistance to the sulfur to prevent the primary sulfur-burning chamber from entirely filling with sulfur;

a secondary sulfur-burning chamber having:

a gas inlet in communication with the gas outlet from the primary sulfur-burning chamber enclosure at a first end of the secondary sulfur-burning chamber to receive effluent gas containing sulfur, sulfur dioxide, and oxygen discharged from the gas outlet of the primary sulfur-burning chamber, and a secondary air inlet proximate the first end of said secondary sulfur-burning chamber to allow desired amounts of oxygen-containing gas to enter the secondary sulfur-burning chamber;

means defining a tortuous flow path of said secondary sulfur-burning chamber for causing turbulent flow of gas passing therethrough for combustion with the secondary air of substantially all of the sulfur in the effluent gas to sulfur dioxide;

a gas outlet at a second end of said secondary sulfur-burning chamber to transmit burned gases out of the secondary sulfur-burning chamber;

negative pressure means operably connected to the primary and secondary sulfur-burning chambers for creating negative pressure within the primary and secondary sulfur-burning chambers to draw in desired amounts of oxygen-containing gas into said chambers through the primary and secondary air inlets;

means connected to the secondary air inlet to variably control the amount of air drawn through the secondary air inlet, thereby controlling the amount of oxygen-containing air entering the primary and secondary sulfur burning chambers in response to a pH measurement;

a sulfur dioxide absorption tower having a water inlet at the top thereof and a gas inlet at the bottom thereof for countercurrent flow of gas and water therein;

a conduit between the gas inlet of the absorption tower and the outlet of the secondary sulfur-burning chamber; and means for introducing water to the absorption tower at the water inlet.

10. The apparatus of claim 9 wherein the negative pressure means comprise an exhaust fan associated with the top of the absorption tower to draw gases through the tower; thereby creating negative pressure within the primary and secondary sulfur-burning chambers.

11. The apparatus of claim 9 in which the ignition means comprise an alcohol BUNSEN burner.

12. The apparatus of claim, 9 in which the primary sulfur-burning chamber comprises an internal skirt positioned in the primary sulfur-burning chamber so as to form an annular region above the primary air inlet.

13. The apparatus of claim 9 in which the width of the conduit from the sulfur feed tank is about equal to a diameter of the primary sulfur-burning chamber enclosure.

14. The apparatus of claim 1 in which the conduit from the sulfur feed tank has a cross-sectional area about 40% of the surface of the primary sulfur-burning chamber enclosure.

15. The apparatus of claim 9 in which the primary air inlet is positioned to introduce air approximately horizontally.

16. The apparatus of claims 1 or 9 in which the secondary sulfur-burning chamber structure contains a plurality of baffles within the flow path defined in said secondary sulfur-burning chamber and having flow portions of reduced cross-sectional area at the ends of the baffles.

17. The apparatus of claims 1 or 15 in which the bottom portion of the walls of the sulfur feed tank farthest from the primary sulfur-burning chamber is flat and slopes inwardly toward the primary sulfur-burning chamber.

18. The apparatus of claims 1 or 15 including manually operated blower means structurally connected to and in communication with the primary sulfur burning chamber to provide additional air and assist in igniting the sulfur.

* * * * *